Oct. 8, 1968     T. P. FLEER     3,404,866
GAS VALVE
Filed May 26, 1966
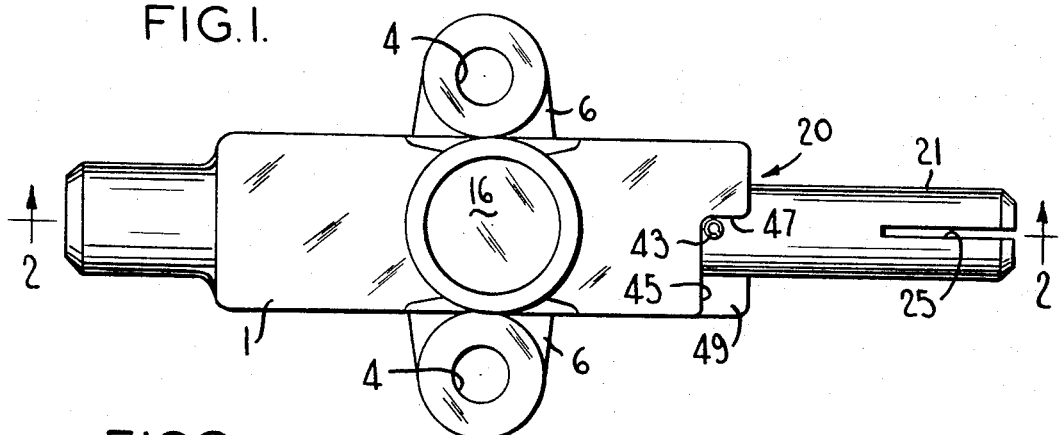
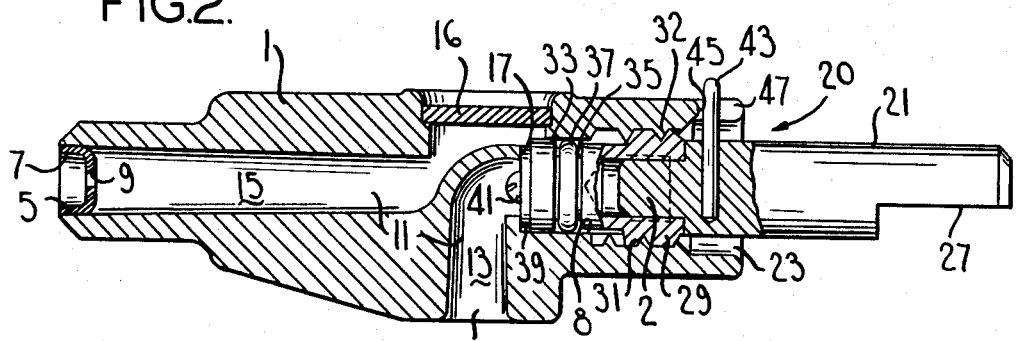
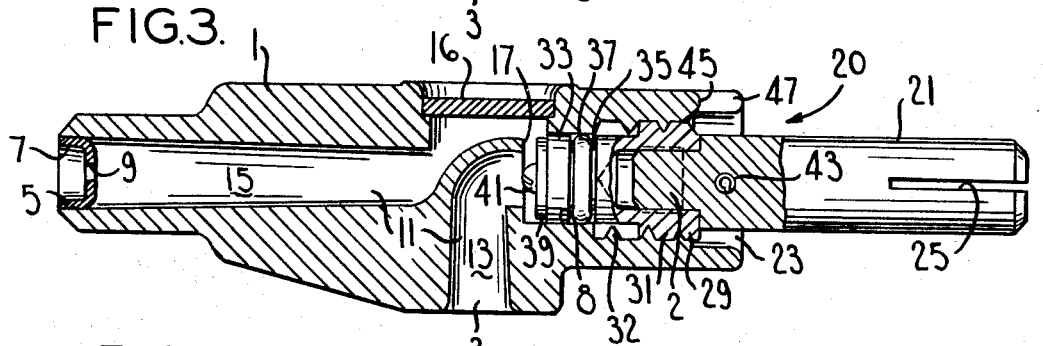
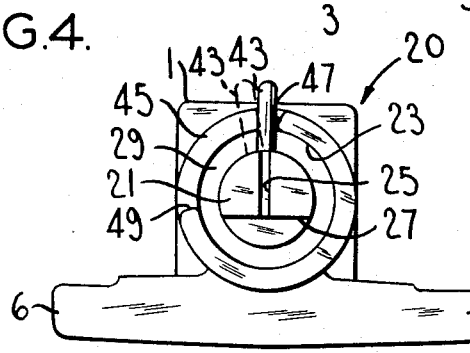
Thomas P. Fleer,
Inventor.
Koenig, Senniger, Powers and Leavitt,
Attorneys.

United States Patent Office 3,404,866
Patented Oct. 8, 1968

3,404,866
GAS VALVE
Thomas P. Fleer, Affton, Mo., assignor to Aurora Corporation of Illinois, Chicago, Ill., a corporation of Illinois
Filed May 26, 1966, Ser. No. 553,072
4 Claims. (Cl. 251—284)

This invention relates to gas valves particularly suitable for controlling flow of gas to top burners of gas stoves, gas ranges and the like.

Among the several objects of this invention may be noted the provision of a safe, compactly arranged gas valve for top burners of a gas range which avoids the need to compensate for wear of the conventionally employed conical plug valve, such a plug valve being eliminated; the provision of a gas valve which prevents excessive closing pressure and scoring between a valve member and its seat; and the provision of such a gas valve which has a trouble-free life. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a plan view of a gas valve made according to the invention;

FIG. 2 is an axial section viewed on line 2—2 of FIG. 1, showing the valve closed;

FIG. 3 is a section similar to FIG. 2 showing the valve open; and

FIG. 4 is a view from the right end of FIG. 2.

Corresponding reference characters indicate corresponding parts throughout the several views of the drawings.

Referring now to the drawings, the valve comprises an elongate body 1 having a transverse gas inlet 3 and gas outlet passage 5 extending into the body from one end. Holes 4 in ears 6 at the sides of the body receive bolts (not shown) for mounting the valve on a gas range. In outlet 5 is a cup-shaped insert 7 having a small orifice 9 to restrict the flow of gas through the valve.

Inlet 3 and outlet 5 are connected by a gas passage generally designated 11. Passage 11 includes a transverse branch 13 communicating with inlet 3 and an axial branch 15 communicating with outlet 5. The inner terminus of branch 13 is curved in an axial direction. The valve is preferably cast and passage 11 formed by suitable coring in a mold. A pressed-in plug 16 closes a part of the cored portion, which for convenience in coring is formed as shown.

Branches 13 and 15 meet at a transverse annular flat seat 17. Seat 17 lies in a plane generally parallel to the axis of branch 13 and substantially perpendicular to the axis of branch 15, being coaxial therewith.

Referring to FIGS. 2 and 3, a rotary valve assembly 20 has an end portion which fits into an opening 23 extending into the valve body 1 from its other end to the right side of seat 17. Valve assembly 20 comprises an outer portion constituting an operating stem 21. The stem 21 has a slot 25 and a flat 27. A suitable dial or knob (not shown) fits over the outer end of the stem for turning the valve member.

Mounted with a press fit on a nose 2 on the left end of the operating stem 21 is a sleeve 29 having a threaded portion 31 fitting threads 32 in the opening 23. This is to provide helical movement of the assembly 20 around and along an axis of rotation. If desired, sleeve 29 may be made integral with the stem 21. A resilient O-ring seal 37 is located in a groove 35 in a cylindrical portion 33. Groove 35 is wider than the O-ring. The O-ring externally engages a cylindrical inner part 8 of the opening 23. This prevents passage of gas from seat 17 through the opening 23 to the atmosphere. As will appear, assembly 20 has a rotary and an axial movement. In response to the latter axial movement the O-ring has some toroidal rolling action between the inner surface of cylindrical part 8 and the bottom of groove 35. In response to the rotary movement the sealing surfaces of the O-ring slide on cylinder 8 or on the groove surfaces or both. An annular resilient sealing washer 39 at the left end of cylindrical portion 33 is mounted on the valve member by a central supporting screw 41 which passes through the washer. The washer 39 is substantially soft but having good tear resistance, being made, for example, of a silicone rubber which has a Shore durometer hardness reading in the range of thirty to sixty-five. Other suitable materials made to the same value of hardness may be impervious high-temperature neoprene-base rubber, polyurethane, Teflon or the like. Teflon is a plastic consisting of tetrafluoroethylene polymer. The portion of washer 39 encircling the head of screw 41 engages seat 17 to close communication between branches 13 and 15 of passage 11 when the stem 21 is in the closed position illustrated in FIG. 2. When washer 39 is backed away from seat 17 to the position illustrated in FIG. 3 in the drawings, then gas may flow from inlet 3 through branch 13 of passage 11, past seat 17 and then through branch 15 and orifice 9 to the outlet 5 of the valve.

A longitudinally split pin 43 removably mounted in the stem 21 projects through a circular slot 45 formed in the right-hand cylindrical end portion of the body 1. Thus the pin constitutes a quick-detachable projection from the valve assembly. The ends 47 and 49 of the slot may, for example, be approximately 90° apart, as shown. The pin 43 is mounted in the stem 21 so that it is in its FIG. 4 dotted-line position when the washer first contacts seat 17. The pin engages the end 47 of the slot shortly after the washer 39 initially contacts seat 17. Thus after the soft washer 39 engages the seat 17 it is only limitedly squeezed. As a result the washer cannot be excessively squeezed, regardless of how much torque an operator applies to the stem 21. This prevents any damage to the soft washer by over-compression. Moreover, rotary sliding action of the washer on the seat is substantially minimized, thus reducing scoring. This is because the washer is soft enough or resilient enough that once static friction has been set up between the face of the washer and the seat upon initial contact, additional torque applied to the washer in bringing the pin 43 from the dotted-line position to the solid-line position (FIG. 4) results in a twisting mode of deformation of the soft material of the washer. Thus the valve closes the communication between passages 13 and 15 with very little, if any, scoring action of the washer on its seat. The pin engages the other end 49 of the slot when valve member 21 is in its maximum open position, i.e., when the washer 39 is at its maximum distance from seat 17. This is the FIG. 3 position.

It will be understood that the ends 47, 49 of the slot may be any appropriate arcuately measured distance apart, depending upon the lead of the threads 31 and 32, thus obtaining any desired maximum opening between washer 39 and seat 17. For example, the same opening of the valve can be achieved by decreasing the lead of threads 31 and increasing the distance between the ends 47 and 49 of the slot.

Operation is as follows:

The valve is normally mounted in a gas range with its outlet end 5 communicating with an air-gas mixing device to provide the desired mixture of air and gas to the top burner of the range. Inlet 3 is placed in communication with a main gas line. It will be assumed that initially the valve is in its FIG. 2 position where the washer 39 engages seat 17 with sufficient force lightly to compress the washer and thus seal the valve to prevent passage of gas from branch 13 to branch 15 of the passage past seat 17. When it is desired to open the valve to provide gas to the top burner, the valve member 21 is rotated counterclockwise (as viewed in FIG. 4) to back the washer 39 away from seat 17 toward its FIG. 3 position. The limiting open position occurs when pin 43 engages the stop-forming end 49 of slot 45. When washer 39 is separated from seat 17, gas delivered to the inlet 3 from the main gas line passes through the branch 13, past seat 17 into the branch 15 and then through orifice 9 and outlet 5 for delivery to the burner of the range.

In order to close the valve, the valve member 21 is rotated clockwise until pin 43 engages the end 47 of the slot 45. As pin 43 moves from its dotted-line position to the solid-line position in FIG. 4, washer 39 is compressed against seat 17 to close communication between branches 13 and 15 of the passage, thereby cutting off gas flow to the top burner. Scoring is minimized because the final turning action is taken up primarily by twist in the material of the washer, rather than by any large sliding action of the washer on the seat 17. The pin stops movement of the valve member before it compresses the soft washer excessively. This extends the useful life of the washer. It will be apparent that the washer 39 may be easily replaced if its substance deteriorates with age. This is done by pulling out the pin 43, backing the assembly 20 out of the body 1 and replacing the washer thereon.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A gas valve comprising a body of elongate form having an opening extending into it from one end,
    an outlet gas passage extending into the body from its other end,
    an inlet gas passage extending transversely into the body from one side and having a portion turned toward said opening and forming a seat,
    said body having an inside hollow portion connecting said turned portion with said outlet passage,
    said opening being formed interiorly first with a cylindrical portion adjacent said turned portion of the inlet, second with an axial exterior cylindrical portion having a peripheral slot therein, and third, with an intermediate threaded portion therebetween,
    a rotatatable valve assembly extending through said opening and including a cylindrical end including packing in said cylindrical portion of the body,
    a resilient washer carried on the end of said cylindrical portion of the valve assembly engageable with said seat,
    said assembly including a threaded portion threaded with said threaded portion of the body,
    and a transverse extension from said valve assembly movable in said slot,
    terminal portions of said slot forming stops for said extension positioned positively and substantially to limit rotation of the valve assembly after initial seating of the washer on said seat, whereby compression on the washer is substantially limited below the maximum compression of which it is capable after seating thereof.

2. A gas valve according to claim 1, wherein said washer is substantially soft, having a Shore hardness in the range of approximately thirty to sixty-five so that after said limited compression thereof its material is capable of deforming in a twisting mode.

3. A gas valve according to claim 2, wherein said washer is composed of a substance selected from the group consisting of silicone rubber, neoprene-base rubber polyurethane and tetrafluoroethylene polymer.

4. A gas valve according to claim 1, wherein said extension is in the form of a member having a quick-detachable connection with the valve assembly whereby when the extension is detached the valve assembly may be removed by unthreading it from said body for replacement of said washer.

References Cited

UNITED STATES PATENTS

| | | | |
|---|---|---|---|
| 59,346 | 11/1866 | Blake | 251—331 X |
| 220,404 | 10/1879 | Mern | 251—218 X |
| 275,487 | 4/1883 | Hogan | 137—446 |
| 721,766 | 3/1903 | Williamson | 251—215 X |
| 1,381,129 | 6/1921 | Maul | 251—284 X |
| 1,886,058 | 11/1932 | Shoemaker | 251—284 X |
| 2,930,401 | 3/1960 | Cowan | 251—368 X |
| 3,112,759 | 12/1963 | De Lucia | 251—368 X |
| 3,122,756 | 3/1964 | Bradley | 251—285 X |
| 3,236,496 | 2/1966 | Rosenstein et al. | 251—368 X |
| 3,255,775 | 6/1966 | Albro et al. | 251—284 X |

M. CARY NELSON, *Primary Examiner.*

ROBERT C. MILLER, *Assistant Examiner.*